United States Patent [19]

Kunstmann et al.

[11] 4,024,125
[45] May 17, 1977

[54] DIS-AZO PIGMENTS DERIVING FROM BIS-DIAZOTIZED DIAMINO-2-PHENYL-BENZAZOLONES

[75] Inventors: Walter Kunstmann, Neuenhain, Taunus; Joachim Ribka, Offenbach am Main, both of Germany

[73] Assignee: Hoechst Aktiengesellschaft, Frankfurt am Main, Germany

[22] Filed: Oct. 29, 1975

[21] Appl. No.: 626,836

Related U.S. Application Data

[63] Continuation of Ser. No. 434,040, Jan. 17, 1974, abandoned.

[30] Foreign Application Priority Data

Jan. 19, 1973   Germany ............... 2302522

[52] U.S. Cl. ............... 260/157; 260/158; 260/160; 260/304 R; 260/307 D; 260/309.2
[51] Int. Cl.² .................. C09B 35/34
[58] Field of Search .......... 260/157, 158, 160

[56] References Cited

UNITED STATES PATENTS 2,195,011   3/1940   Petitcolas et al. ........... 260/158 X

FOREIGN PATENTS OR APPLICATIONS 854,156   1/1940   France ................ 260/158

*Primary Examiner*—Charles F. Warren
*Attorney, Agent, or Firm*—Curtis, Morris & Safford

[57] ABSTRACT

Pigments of the general formula

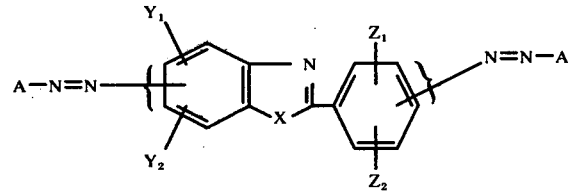

wherein x is sulfur, oxygen or —NR—, R is hydrogen or alkyl of 1 to 4 carbon atoms, A is

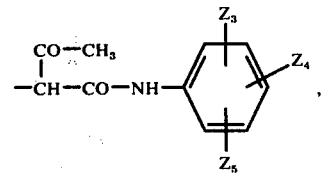

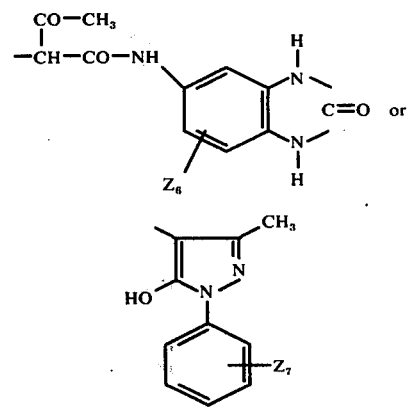

$Y_1$, $Y_2$, $Z_1$, $Z_2$, $Z_3$, $Z_4$, $Z_5$, $Z_6$ and $Z_7$ are hydrogen, chlorine, bromine, methyl, ethyl, methoxy or ethoxy. These new disazo pigments can be used in all fields of dyeing where pigments are typically used. They are distinguished by improved fastness properties and tinctorial strength.

6 Claims, No Drawings

DIS-AZO PIGMENTS DERIVING FROM BIS-DIAZOTIZED DIAMINO-2-PHENYL-BENZAZOLONES

This is a continuation, of application Ser. No. 434,040, filed Jan. 17, 1974, now abandoned.

The present invention relates to novel disazo pigments and a process for their preparation.

More particularly it relates to pigments of the general formula I

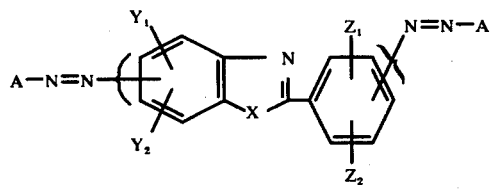

wherein X stands for an oxygen atom, a sulfur atom or a grouping —NR—, R stands for a hydrogen atom or an alkyl group having 1 to 4 carbon atoms and A stands for a radical of the general formulae 2, 3 or 4

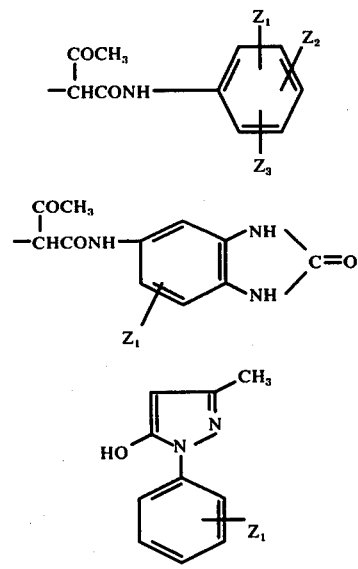

wherein $Y_1$, $Y_2$, $Z_1$, $Z_2$ and $Z_3$ are identical or different and stand for a hydrogen atom, a halogen atom, preferably a chlorine or bromine atom, a methyl, ethyl, methoxy or ethoxy group.

The disazo pigments of the general formula

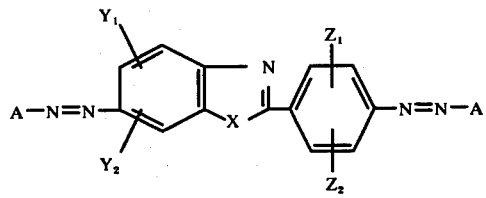

wherein X stands for an oxygen atom or a sulfur atom and A, $Y_1$, $Y_2$, $Z_1$ and $Z_2$ are defined as above, are especially interesting.

Furthermore, the present invention provides a process for the preparation of the pigments mentioned above, which process comprises coupling tetrazotized, aromatic diamines of the general formula 5

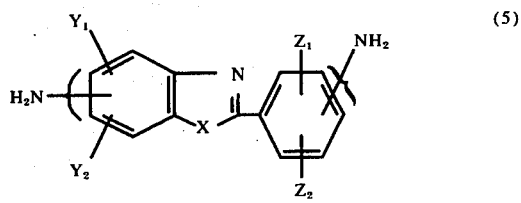

with the coupling components corresponding to the groups of the formulae 2, 3 or 4, X, $Y_1Y_2$, $Z_1$ and $Z_3$ having the meanings given above.

The diamines of the general formula 5 used in this invention are generally known and can be prepared according to known methods, for example, according to J. Heterocyclic Chem. 6 (1969) 119, by the condensation of dihydrochlorides of diamines of the general formula 6

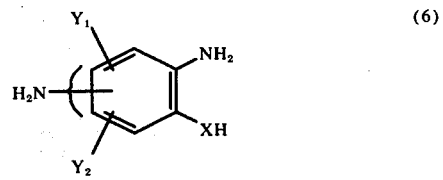

with aminobenzoic acids of the general formula 7

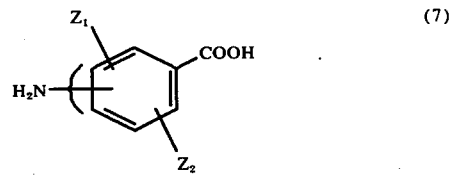

in polyphosphoric acid, X, $Y_1$, $Y_2$, $Z_1$ and $Z_2$ having the meanings given above.

Suitable diamines of the general formula 5 are, for example the following:
6-amino-2-(4'-aminophenyl)-benzoxazole
5-chloro-6-amino-2-(4'-aminophenyl)-benzoxazole
5-bromo-6-amino-2-(4'-aminophenyl)-benzoxazole
5,7-dichloro-6-amino-2-(4'-aminophenyl)-benzoxazole
5-methyl-6-amino-2-(4'-aminophenyl)-benzoxazole
5,7-dimethyl-6-amino-2-(4'-aminophenyl)-benzoxazole
5-ethyl-6-amino-2-(4'-aminophenyl)-benzoxazole
5-methoxy-6-amino-2-(4'-aminophenyl)-benzoxazole
5-ethoxy-6-amino-2-(4'-aminophenyl)-benzoxazole
6-amino-2-(2'-chloro-4'-aminophenyl)benzoxazole
5-chloro-6-amino-2-(3'-chloro-4'-aminophenyl)-benzoxazole
6-amino-2-(3'-aminophenyl)-benzoxazole
6-amino-2-(4',6'-dichloro-3'-aminophenyl)-benzoxazole
5-amino-2-(4'-aminophenyl)-benzoxazole
6-chloro-5-2-(4'-aminophenyl)-benzoxazole
7-chloro-5-amino-2-(4'-aminophenyl)-benzoxazole
7-methyl-5-amino-2-(4'-aminophenyl)-benzoxazole
5-amino-2-(3'-aminophenyl)-benzoxazole
6-amino-2-(4'-aminophenyl)-benzthiazole
5-chloro-6-amino-2-(4'-aminophenyl)-benzthiazole 5-bromo-6-amino-2-(4'-aminophenyl)-benzthiazole
5,7-dichloro-6-amino-2-(4'-aminophenyl)-benzthiazole
5-methyl-6-amino-2-(4'-aminophenyl)-benzthiazole
5-methoxy-6-amino-2-(4'-aminophenyl)-benzthiazole
5-chloro-6-amino-2-(3'-chloro-4'-aminophenyl)-benzthiazole
6-amino-2-(3'-aminophenyl)-benzthiazole
6-amino-2-(4',6'-dichloro-3'-aminophenyl)-benzthiazole
5-amino-2-(4'-aminophenyl)-benzthiazole
6-chloro-5-amino-2-(4'-aminophenyl)-benzthiazole
5-amino-2-(3'-aminophenyl)-benzthiazole
6-amino-2-(4'-aminophenyl)-benzimidazole
4-chloro-6-amino-2-(4'-aminophenyl)-benzimidazole
5-chloro-6-amino-2-(4'-aminophenyl)-benzimidazole
5-methyl-6-amino-2-(4'-aminophenyl)-benzimidazole
5-ethoxy-6-amino-2-(4'-aminophenyl)-benzimidazole
6-amino-2-(2'-chloro-4'-aminophenyl)-benzimidazole
6-amino-2-(3'-chloro-4'-aminophenyl)-benzimidazole
6-amino-2-(3'-aminophenyl)-benzimidazole
6-chloro-6-amino-2-(3'-aminophenyl)-benzimidazole
5-amino-2-(4'-aminophenyl)-benzimidazole
7-chloro-5-amino-2-(4'-aminophenyl)-benzimidazole
6-amino-2-(4'-aminophenyl)-1-methyl-benzimidazole
4-chloro-6-amino-2-(4'-aminophenyl)-1-methyl-benzimidazole
3-amino-2-(4'-aminophenyl)-1-ethyl-benzimidazole
7-chloro-5-amino-2-(4'-aminophenyl)-1-methyl-benzimidazole.

The compounds employed as coupling components are generally described in literature and can be prepared according to known methods, for example, by reacting an aryl amine or an aminobenzimidazolone with diketene or by reacting acetoacetic acid ethyl ester with phenyl hydrazines. Suitable coupling components are, for example, the following:

N-acetoacetyl-aniline
N-acetoacetyl-2-chloro-aniline
N-acetoacetyl-4-chloro-aniline
N-acetoacetyl-4-bromo-aniline
N-acetoacetyl-2,4-dichloroaniline
2-acetoacetylamino-anisole
4-acetoacetylamino-anisole
4-acetoacetylamino-phenetole
N-acetoacetyl-2,5-dimethoxy-aniline
N-acetoacetyl-2,4-dimethoxy-aniline
N-acetoacetyl-4-chloro-2,5-dimethoxy-aniline
N-acetoacetyl-4-chloro-2,5-diethoxy-aniline
N-acetoacetyl-5-chloro-2,4-dimethoxy-aniline
N-acetoacetyl-5-chloro-2,4-diethoxy-aniline
2-acetoacetylamino-toluene
4-acetoacetylamino-toluene
4-acetoacetylamino-1,3-xylene
2-acetoacetylamino-5-chloro-toluene
5-acetoacetylamino-benzimidazolone
5-acetoacetylamino-6-chloro-benzimidazolone
5-acetoacetylamino-7-chloro-benzimidazolone
5-acetoacetylamino-6-bromo-benzimidazolone
5-acetoacetylamino-7-bromo-benzimidazolone
5-acetoacetylamino-6-methyl-benzimidazolone
5-acetoacetylamino-7-methyl-benzimidazolone
5-acetoacetylamino-7-ethyl-benzimidazolone
5-acetoacetylamino-7-methoxy-benzimidazolone
5-acetoacetylamino-7-ethoxy-benzimidazolone
1-phenyl-3-methyl-5-pyrazolone
1-(2'-tolyl)-3-methyl-5-pyrazolone
1-(4'-tolyl)-3-methyl-5-pyrazolone
1-(2'-chlorophenyl)-3-methyl-5-pyrazolone
1-(4'-chlorophenyl)-3-methyl-5-pyrazolone
1-(2',5'-dichlorophenyl)-3-methyl-5-pyrazolone The coupling reaction can be carried out in known manner, for example, in an organic solvent, for example, methanol or isopropanol or in an aqueous medium, optionally in the presence of non-ionic, anion active or cation active dispersing agents and/or in the presence of organic solvents. To obtain the full tinctorial strength and an especially favorable crystal structure it is often advantageous to heat the coupling mixture for some time and especially to bring it to temperatures above 100° C. The dyeings obtained with the pigments of the invention are especially pure and fast when the pigments are after-treated in the form of moist press cakes or as dry powders, after coupling, with organic solvents, for example, pyridine, dimethyl formamide, dimethyl sulfoxide, N-methyl-pyrrolidone, alcohols, glycol, glycolmonomethyl ether, glacial acetic acid, chlorobenzene, dichlorobenzene or nitrobenzene, optionally under pressure at elevated temperature. In some cases, an especially favorable crystal structure is obtained when heating with water to the boiling temperature or to elevated temperatures under pressure, optionally with the addition of dispersing agents and optionally with the addition of organic solvents, for example, those of the type mentioned hereinbefore.

The new disazo pigments can be employed for most various application fields, for example, the preparation of printing pastes, lacquer colors and disperse colors for painting, for coloring solutions and products made of acetyl cellulose, natural resins and synthetic resins, for example, polymerization or condensation resins, for example, amino or pheno plasts, and those made of polystyrene, polyolefins, for example, polyethylene and polypropylene, polyacrylo compounds, polyvinyl compounds, such as, for example, polyvinyl chloride or polyvinyl acetate, polyesters, caoutchouc, casein or silicone resins.

The new pigments are also suitable for printing on substrates, especially textile fibrous materials or other flat-surface structures, for example, paper. They can also be used, in finely dispersed form for example, for the coloring of viscose rayon or cellulose ethers, or esters, polyamides, polyurethanes, polyglycol terephthalates or polyacrylonitrile in the spinning mass or for the coloring of paper.

Due to their favorable rheological properties, the pigments of the invention can easily be processed in the media mentioned above and display good fastness properties with regard to light, weather and migration. They are stable with regard to heat and yield pure shades and excellent tinctorial strength. They are stable towards chemicals, above all, solvents, acids and alkalis.

French patent specification No. 854,156 describes water-insoluble disazo dyes of the general formula 4 of the French patent specification mentioned above comprises a violet pigment of the formula 9 (X=S)

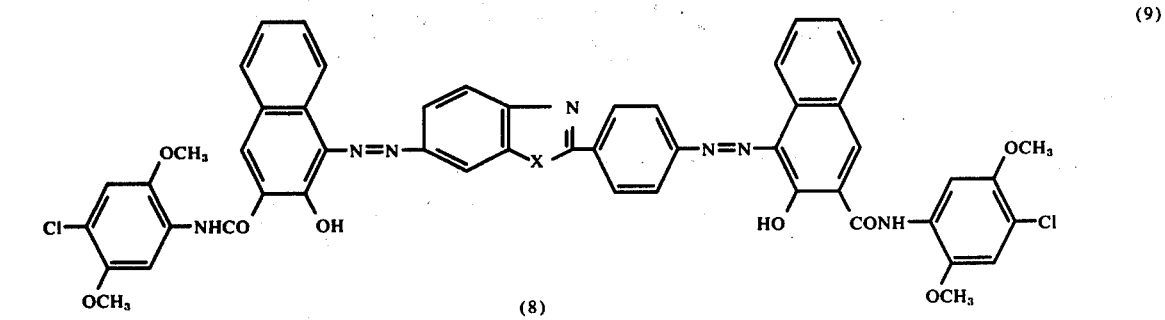

which shows a poor fastness to light in book printing and a poor fastness to light and to migration in polyvinyl chloride. In contradistinction thereto, the yellow pigment of the invention of the formula 10(X=S)

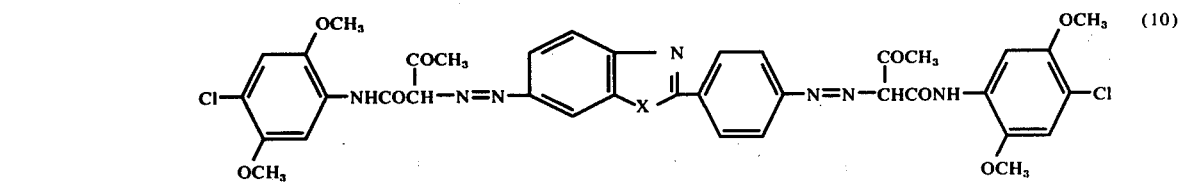

wherein Y stands for a hydrogen atom, a chlorine atom or a methoxy group and B stands for the radical of a coupling component of the 2-hydroxy-3-naphthoylaminoarylide series. These dyes have a constitution largely corresponding to that of the dyes of the invention according to the formula 1 (X=S), but the difference between them is given especially by the different coupling components. Although they are structurally related they show great differences which are expected with regard to the shade but are unexpected with regard to their fastness properties. While the dyestuffs according to examples 3 and 4 of French patent specification No. 854,156 show bluish red to violet shades and relatively poor fastness properties as to light and migration, the disazo pigments of the invention yielding yellow to orange shades are distinguished by considerably improved fastness properties. Example shows excellent fastness properties in book printing and in polyvinyl chloride.

In contradistinction to the yellow disazo pigments available in the commerce which derive from diphenyl bases the pigments of the invention excel by a considerably higher tinctorial strength while their fastness properties are equal or superior. So, for example, the disazo pigment of the above formula 10 (X=S) shows twice the tinctorial strength of the yellow pigment available of the formula 11

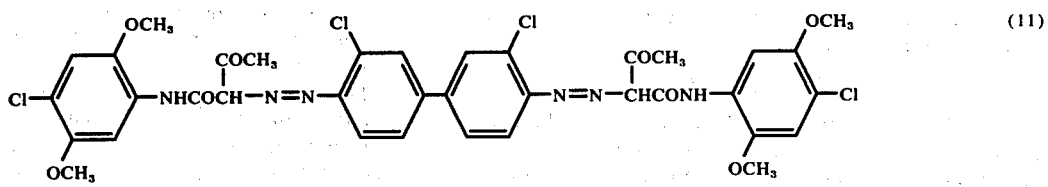

while its fastness to light is about equal in book printing.

Due to that unusually high tinctorial strength and the good fastness to light and to migration, the pigments of the invention are extraordinarily valuable products from the technical point of view. Among the disazo pigments of the invention the following are especially distinguished by their very good fastness properties, their excellent tinctorial strength and their very pure shades:

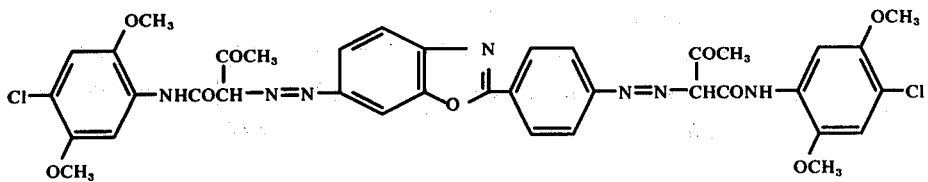

-continued

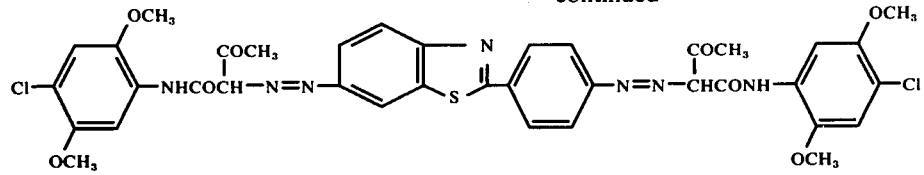

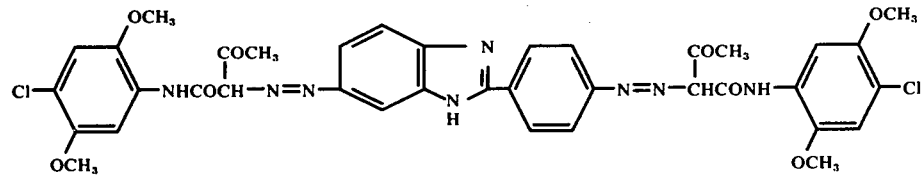

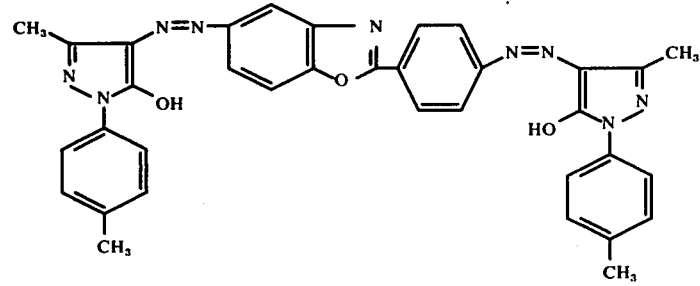

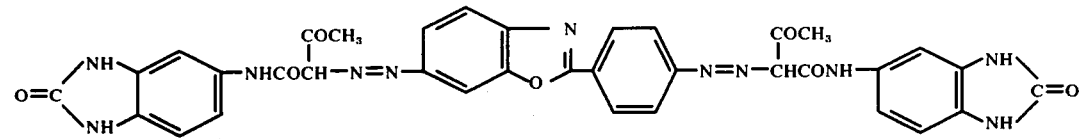

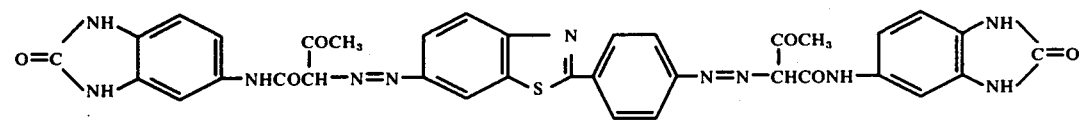

The following Examples illustrate the invention; the parts are by weight, unless otherwise stated, and the relationship of parts by weight to parts by volume is that of the kilo to the liter. The temperature is indicated in degrees centigrade:

EXAMPLE 1

22.5 Parts of 6-amino-2-(4'-aminophenyl)-benzoxazole were stirred in 120 parts by volume of 5 N hydrochloric acid for 2 hours at room temperature, and then tetrazotized at 0°–10° with 41 parts by volume of 5 N sodium nitrite solution. The mixture was stirred for another 30 minutes, the nitrite excess was destroyed by amidosulfonic acid and the solution was clarified. 60 Parts of N-acetoacetyl-4-chloro-2,5-dimethoxy aniline were dissolved in 200 parts by volume of water and 22 parts by volume of sodium hydroxide solution of 33% strength; the solution was clarified. In the coupling vessel, 600 parts by volume of water, 20 parts by volume of glacial acetic acid and 20 parts by volume of a 10% solution of the reaction product of 1 mole of stearyl alcohol and 20 mols of ethylene oxide were placed in advance. The temperature was adjusted at 5° by adding ice and the clarified solution of the coupling component was allowed to run in under the surface. The temperature was raised to 20° and the tetrazonium salt solution was slowly entered. By simultaneously introducing about 200 parts by volume of 2 N sodium hydroxide solution the pH was maintained at about 5.0.

After the coupling has been finished the mixture was stirred for 1 hour, heated to 95° by introducing steam, maintained at that temperature for 30 minutes; the pigment was filtered with suction, washed with water and dried at 60°. 30 Parts of the dry pigment in powdered form were mixed, with stirring, with 370 parts by volume of dimethyl sulfoxide at 170° for 45 minutes, filtered hot with suction, washed with water, dried and ground.

The disazo pigment so obtained of the formula

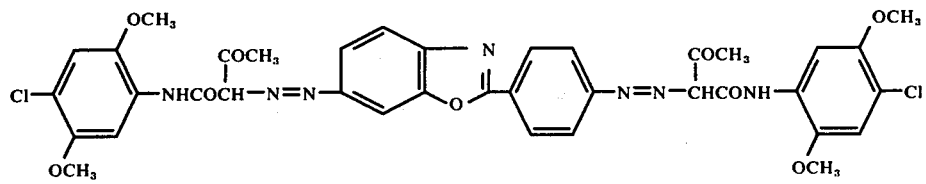

yielded upon being worked in a printing paste, in polyvinylchloride, in a lacquer or in a spinning mass, very pure, reddish yellow shades of excellent tinctorial strength and good to very good fastness to light and to weather influences.

600 parts by volume of pyridine. After it had been run in, the mixture was stirred for 1 hour and boiled under reflux for 1 hour. The disazo pigment was filtered hot with suction, washed with water and dried at 60° and ground.

The disazo pigment so obtained of the formula

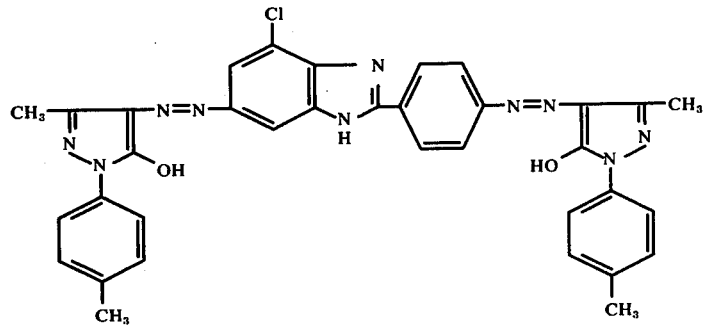

EXAMPLE 2

24.1 Parts of 6-amino-2-(4'-aminophenyl)-benzthiazole were stirred in 120 parts by volume of 5 N hydrochloric acid for 2 hours and tetrazotized in the manner described in example 1. The clarified solution of the tetrazonium salt was allowed to run gradually, at room temperature, to a solution introduced in advance of 60 parts of N-acetacetyl-4-chloro-2,5-dimethoxyaniline in 800 parts by volume of pyridine. After the solution had been run in, the mixture was stirred for 1 hour and filtered off, washed with water and dried at 60° C. 38 Parts of the dry pigment powder were mixed with 430 parts by volume of N-methyl-pyrrolidone at 130° C for 10 minutes. After cooling to 50° C, the mixture was filtered with suction, washed with water, dried and ground.

The disazo pigment so obtained of the formula yielded upon being worked in a printing paste, very pure orange shades of excellent tinctorial strength and good fastness properties.

EXAMPLE 4

22.5 Parts of 5-amino-2-(4'-aminophenyl)-benzoxazole were tetrazotized in a manner described in example 1.

39.5 Parts of 1-(4'-tolyl)-3-methyl-5-pyrazolone were dissolved in a mixture of 400 parts by volume of water, 20 parts by volume of 33% sodium hydroxide solution and 20 parts by volume of a 10% aqueous solution of the reaction product of 1 mol of oleyl alcohol and 30 mols of ethylene oxide. From the clarified solution, the coupling component was precipitated at 0°-5° by adding 16 parts by volume of glacial acetic acid. At 15°-20° the clarified tetrazonium salt solution

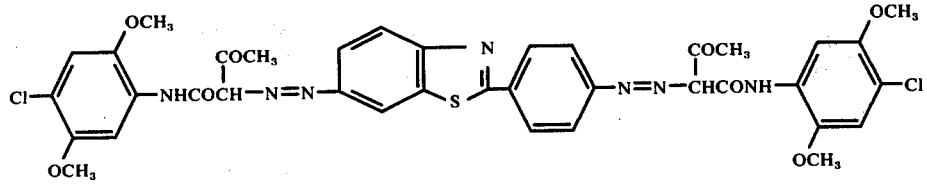

yielded upon working it in a printing paste, in polyvinyl chloride, a lacquer or a spinning mass, very pure, reddish yellow shades of excellent tinctorial strength and good to very good fastness to heat, to migration and to light.

EXAMPLE 3

26.0 Parts of 4-chloro-6-amino-2-(4'-aminophenyl)-benzimidazole were stirred in 120 parts by volume of 5 N hydrochloric acid for 2 hours and tetrazotized in the manner described in example 1. The clarified solution of the tetrazonium salt was allowed to gradually run at room temperature in a solution of 39.5 parts of 1-(4'-tolyl)-3-methyl-5-pyrazolone introduced in advance in was allowed to slowly run into the suspension of the coupling component. The pH was maintained at about 5.0 by introducing at the same time about 200 parts by volume of 2 N sodium hydroxide solution. After coupling had been finished, the suspension was heated to 95° by introducing steam, this temperature was maintained for about 30 minutes, the pigment was filtered with suction, washed with water and dried at 60°.

25 Parts of the dry pigment powder were slowly heated to 175° with 650 parts by volume of dimethyl sulfoxide. After cooling to 50° the mixture was filtered with suction, washed with water, dried and ground.

The disazo pigment so obtained of the formula

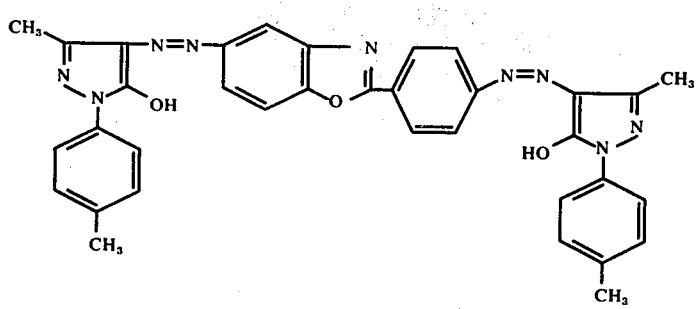

yielded on working it in a printing paste, in polyvinyl chloride, in a lacquer or in a spinning mass, very pure reddish yellow shades of excellent tinctorial strength and good to very good fastness to migration and light.

EXAMPLE 5

22.5 Parts of 6-amino-2-(4'-aminophenyl)-benzoxazole were tetrazotized in a manner described in example 1.

48.9 Parts of 5-acetoacetylamino-benzimidazolone were dissolved in a mixture of 1,000 parts by volume of water, 54 parts by volume of 33% sodium hydroxide solution and 10 parts by volume of a 10% aqueous solution of the sodium salt of the condensation product of oleic acid chloride and N-methyltaurine. At 0°–5° the coupling component was precipitated by adding 40 parts by volume of glacial acetic acid. At 15°–20°, the clarified tetrazonium salt solution was slowly run into the suspension of the coupling component. The pH was maintained at about 5.5 by introducing at the same time about 210 parts by volume of 2 N sodium hydroxide solution. After the coupling had been finished, the mixture was heated to 95° and was maintained at that temperature for 30 minutes. It was filtered with suction, washed and dried. 32 Parts of the dry pigment powder were stirred with 300 parts by volume of N-methyl-pyrrolidone at 200° for 4 hours. After cooling to 50° the mixture was filtered with suction, washed with water, dried and ground.

The disazo pigment so obtained of the formula

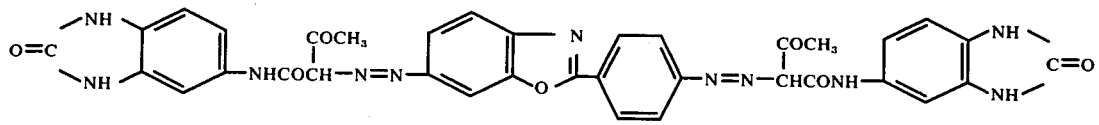

yielded on working it in a lacquer, in a printing paste, in polyvinyl chloride or in a spinning mass, very pure yellow shades having excellent fastness properties.

When using in the foregoing example instead of 6-amino-2-(4'-aminophenyl)-benzoxazole the equivalent amount of 5-chloro-6-amino-2-(4'-aminophenyl)-benzthiazole, a yellow pigment was obtained which yielded upon working it in a printing paste, in a lacquer, in polyvinyl chloride or in a spinning mass, yellow shades having similar good fastness properties.

The invention is further illustrated by reference to the following table which contains a number of further components usable in accordance with the invention and the shades of the graphical prints that are colored by the disazo pigments prepared therefrom in substance.

| Tetrazo component | Coupling component | Shade |
|---|---|---|
| 6-amino-2-(4'-aminophenyl)-benzoxazole | N-acetoacetylaniline | yellow |
| " | 2-acetoacetylamino-toluene | yellow |
| " | 4-acetoacetylamino-1,3-xylene | yellow |
| " | 2-acetoacetylamino-anisole | yellow |
| " | 4-acetoacetylamino-anisole | yellow |
| " | N-acetoacetyl-2-chloro-aniline | yellow |
| " | N-acetoacetyl-4-chloro-aniline | yellow |
| " | N-acetoacetyl-2,5-dichloro-aniline | yellow |
| " | N-acetoacetyl-4-chloro-2,5-diethoxy-aniline | reddish yellow |
| " | 5-acetoacetylamino-7-chlorobenzimidazolone | yellow |
| " | 5-acetoacetylamino-6-methyl-benzimidazolone | yellow |
| " | 5-acetoacetylamino-7-ethoxy-benzimidazolone | yellow |
| " | 1-phenyl-3-methyl-5-pyrazolone | orange |
| " | 1-(4'-tolyl)-3-methyl-5-pyrazolone | orange |
| 5-bromo-6-amino-2-(4'-aminophenyl)-benzoxazole | N-acetoacetyl-2,4-dichloro-aniline | yellow |
| " | N-acetoacetyl-2-ethyl-aniline | yellow |
| " | 1-(2',5'-dichlorophenyl)-3-methyl-5-pyrazolone | orange |
| 5,7-dichloro-6-amino-2-(4'-aminophenyl)-benzoxazole | N-acetoacetyl-4-chloro-2,5-diethoxy-aniline | reddish yellow |
| " | N-acetoacetylaniline | yellow |
| 6-amino-5-methoxy-2-(4')-aminophenyl)-benzoxazole | 5-acetoacetylamino-7-bromo-benzimidazolone | yellow |
| 5-chloro-6-amino-2-(3'-chloro-amino-phenyl)-benzoxazole | N-acetoacetyl-4-bromo-aniline | yellow |
| " | N-acetoacetyl-4-bromo-aniline | yellow |
| " | 5-acetoacetylamino-7-chloro-benzimidazolone | yellow |
| 6-amino-2-(3'-aminophenyl)-benzoxazole | 1-phenyl-3-methyl-5-pyrazolone | reddish yellow |
| " | 5-acetoacetylamino-benzimidazolone | yellow |
| 6-amino-2-(4',6'-dichloro-3'-aminophenyl)-benzoxazole | 5-acetoacetylamino-benzimidazolone | greenish yellow |
| 5-amino-2-(4'-aminophenyl)-benzoxazole | N-acetoacetylaniline | greenish yellow |
| " | 2-acetoacetylamino-toluene | greenish yellow |
| " | 4-acetoacetylamino-1,3-xylene | greenish yellow |
| " | 2-acetoacetylamino-anisole | greenish yellow |

-continued

| Tetrazo component | Coupling component | Shade |
|---|---|---|
| " | N-acetoacetyl-4-chloro-2,5-dimethoxy-aniline | greenish yellow |
| 7-chloro-5-amino-2-(4'-aminophenyl)-benzoxazole | N-acetoacetyl-4-bromo-2,5-dimethoxy-aniline | greenish yellow |
| " | 1-(2'-5'-dichlorophenyl)-3-methyl-5-pyrazolone | reddish yellow |
| 5-amino-2-(3'-aminophenyl)-benzoxazole | N-acetoacetyl-4-chloro-2,5-diethoxy-aniline | greenish yellow |
| " | 5-acetoacetylamino-benzimidazolone | greenish yellow |
| 6-amino-2-(4'-aminophenyl)-benzthiazole | N-acetoacetylaniline | yellow |
| " | 4-acetoacetylamino-1,3-xylene | yellow |
| " | N-acetoacetyl-4-chloro-2,5-diethoxy-aniline | reddish yellow |
| " | N-acetoacetyl-2,5-dichloro-aniline | yellow |
| " | N-acetoacetyl-4-bromo-aniline | yellow |
| " | 5-acetoacetylamino-benzimidazolone | reddish yellow |
| " | 5-acetoacetylamino-7-chloro-benzimidazolone | yellow |
| " | 1-phenyl-3-methyl-5-pyrazolone | orange |
| " | 1-(4'-tolyl)-3-methyl-5-pyrazolone | orange |
| 5-chloro-6-amino-2-(4'-aminophenyl)-benzthiazole | N-acetoacetyl-4-chloro-2,5-dimethoxy-aniline | reddish yellow |
| " | 1-(2',5'-dichlorophenyl)-3-methyl-5-pyrazolone | orange |
| " | 5-acetoacetylamino-7-bromo-benzimidazolone | yellow |
| 5-methyl-6-amino-2-(4'-aminophenyl)-benzthiazole | 5-acetoacetylamino-7-chloro-benzimidazolone | yellow |
| 6-amino-2-(3'-aminophenyl)-benzthiazole | 5-acetoacetylamino benzimidazolone | greenish yellow |
| " | N-acetoacetyl-4-bromo-2,5-diethoxy-aniline | greenish yellow |
| 5-amino-2-(4'-aminophenyl)-benzthiazole | 4-acetoacetylamino-1,3-xylene | greenish yellow |
| " | 1-(4'-tolyl)-3-methyl-5-pyrazolone | reddish yellow |
| " | 5-acetoacetylamino-benzimidazolone | greenish yellow |
| 7-chloro-5-amino-2-(4'-aminophenyl)-benzthiazole | N-acetoacetyl-4-chloro-2,5-dimethoxy-aniline | greenish yellow |
| " | 5-acetoacetylamino-7-ethoxy-benzimidazolone | greenish yellow |
| 6-amino-2-(4'-aminophenyl)-benzimidazole | N-acetoacetylaniline | yellow |
| " | N-acetoacetyl-2-chloro-aniline | yellow |
| " | N-acetoacetyl-2,4-dichloro-aniline | yellow |
| " | 2-acetoacetylamino-anisole | yellow |
| " | N-acetoacetyl-4-chloro-2,5-dimethoxy-aniline | yellow |
| " | 4-acetoacetylamino-1,3-xylene | yellow |
| " | 1-phenyl-3-methyl-5-pyrazolone | yellow orange |
| " | 1-(4'-tolyl)-3-methyl-5-pyrazolone | orange |
| " | 5-acetoacetylamino-benzimidazolone | yellow |
| " | 5-acetoacetylamino-7-chloro-benzimidazolone | yellow |
| 4-chloro-6-amino-2-(4'-aminophenyl)-benzimidazole | N-acetoacetyl-aniline | yellow |
| " | N-acetoacetyl-4-bromo-aniline | yellow |
| " | N-acetoacetyl-4-chloro-2,5-diethoxy-aniline | yellow |
| " | 4-acetoacetylamino-phenetole | yellow |
| " | 4-acetoacetylamino-1,3-xylene | yellow |
| " | 1-(2',5'-dichlorophenyl)-3-methyl-5-pyrazolone | orange |
| " | 5-acetoacetylamino-benzimidazolone | yellow |
| 6-amino-5-methyl-2-(4'-aminophenyl)-benzimidazole | N-acetoacetyl-4-chloro-2,5-dimethoxy-aniline | reddish yellow |
| 6-amino-5-ethoxy-2-(4'-aminophenyl)-benzimidazole | 5-acetoacetylamino benzimidazolone | yellow |
| 6-amino-2-(2'-chloro-4'-aminophenyl)-benzimidazole | N-acetoacetylaniline | yellow |
| 6-amino-2-(3'-chloro-4'-aminophenyl)-benzimidazole | 2-acetoacetylamino-phenetole | yellow |
| 6-amino-2-(3'-aminophenyl)-benzimidazole | N-acetoacetyl-4-chloro-2,5-dimethoxyaniline | greenish yellow |
| " | 5-acetoacetylamino-7-chloro-benzimidazolone | greenish yellow |
| " | 1-(4'-tolyl)-3-methyl-5-pyrazolone | yellow |
| 4-chloro-6-amino-2-(3'-aminophenyl)-benzimidazole | N-acetoacetyl-4-chloro-2,5-diethoxy-aniline | greenish yellow |
| 7-chloro-5-amino-2-(4'-aminophenyl)-benzimidazole | 5-acetoacetylamino-benzimidazolone | greenish yellow |
| " | N-acetoacetyl-2,4-dichloro-aniline | greenish yellow |
| 7-bromo-5-amino-2-(4'-aminophenyl)-benzimidazole | 4-acetoacetylamino-1,3-xylene | greenish yellow |
| 6-amino-2-(4'-aminophenyl)-1-methyl-benzimidazole | N-acetoacetyl-4-chloro-2,5-dimethoxy-aniline | reddish yellow |
| " | 5-acetoacetylamino-benzimidazolone | yellow |
| " | 5-acetoacetylamino-7-bromo-benzimidazolone | yellow |
| 7-chloro-5-amino-2-(4'-aminophenyl)-1-ethyl-benzimidazole | N-acetoacetyl-4-chloro-diethoxy-aniline | yellow |
| " | 1-(2',5'-dichlorophenyl)-3-methyl-5-pyrazolone | reddish yellow |
| " | 5-acetoacetylamino-benzimidazolone | greenish yellow |

We claim:
1. A compound of the formula

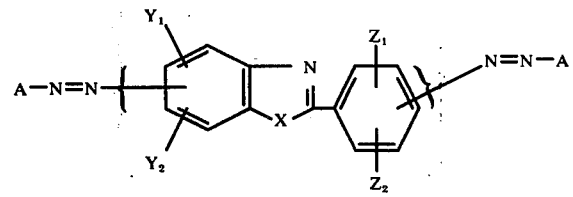

wherein X is sulfur, oxygen or —NR—, R is hydrogen or alkyl of 1 to 4 carbon atoms, A is

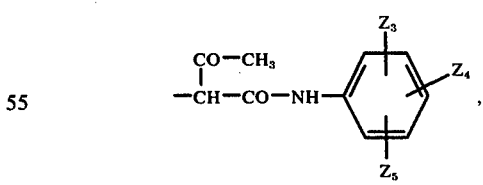

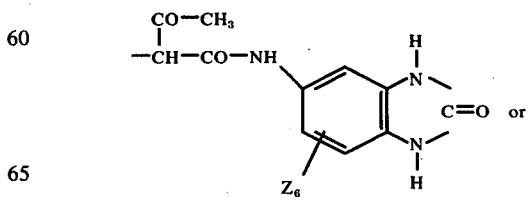 or $Y_1$, $Y_2$, $Z_1$, $Z_2$, $Z_3$, $Z_4$, $Z_5$, $Z_6$ and $Z_7$ are hydrogen, chlorine, bromine, methyl, ethyl, methoxy or ethoxy.
2. A compound as claimed in claim 1, wherein X is sulfur or oxygen.
3. The compound of claim 1 which is
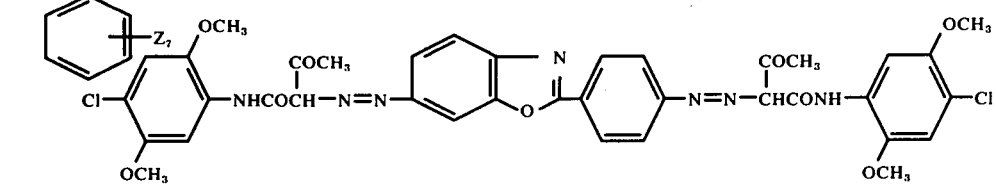
4. The compound of claim 1 which is
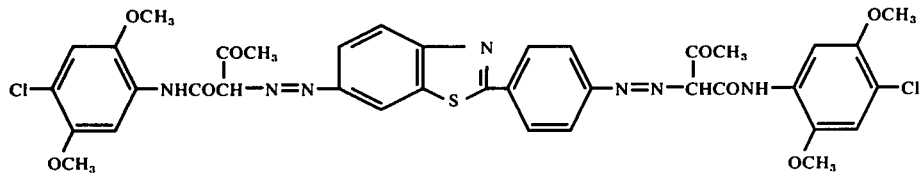
5. The compound of claim 1 which is
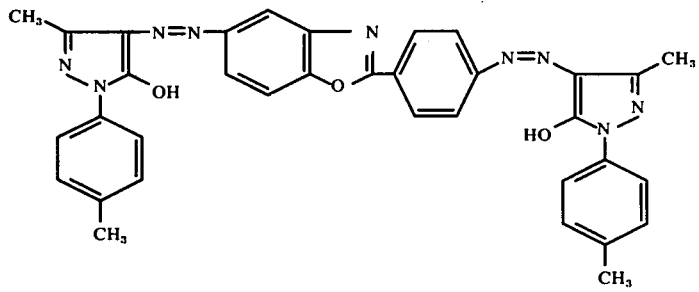
6. The compound of claim 1 which is
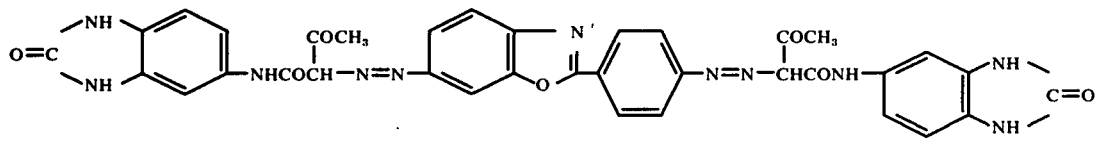
* * * * *